March 21, 1961     D. W. KERST ET AL     2,976,444
COUPLING DEVICE

Filed June 23, 1958     3 Sheets-Sheet 1

INVENTORS.
Donald W. Kerst
David F. Brower
BY
Soans, Anderson, Luedeka & Fitch
Attys.

March 21, 1961 D. W. KERST ET AL 2,976,444
COUPLING DEVICE
Filed June 23, 1958 3 Sheets-Sheet 2
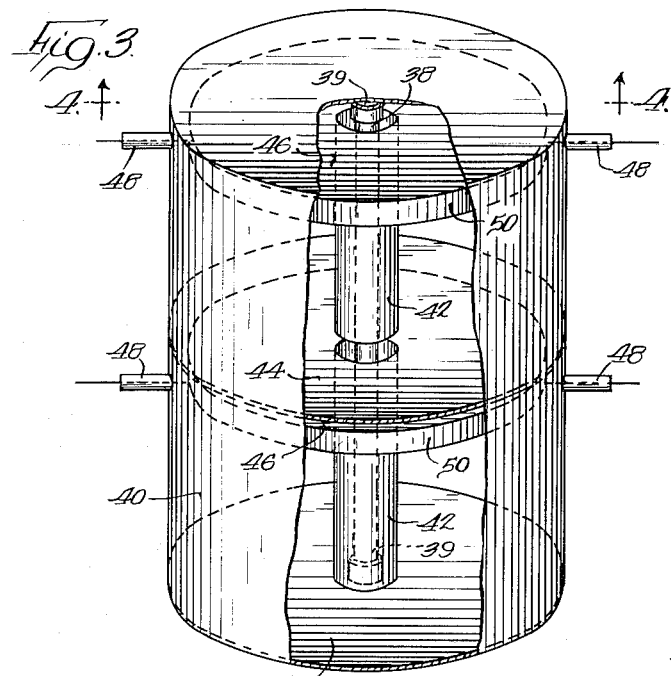
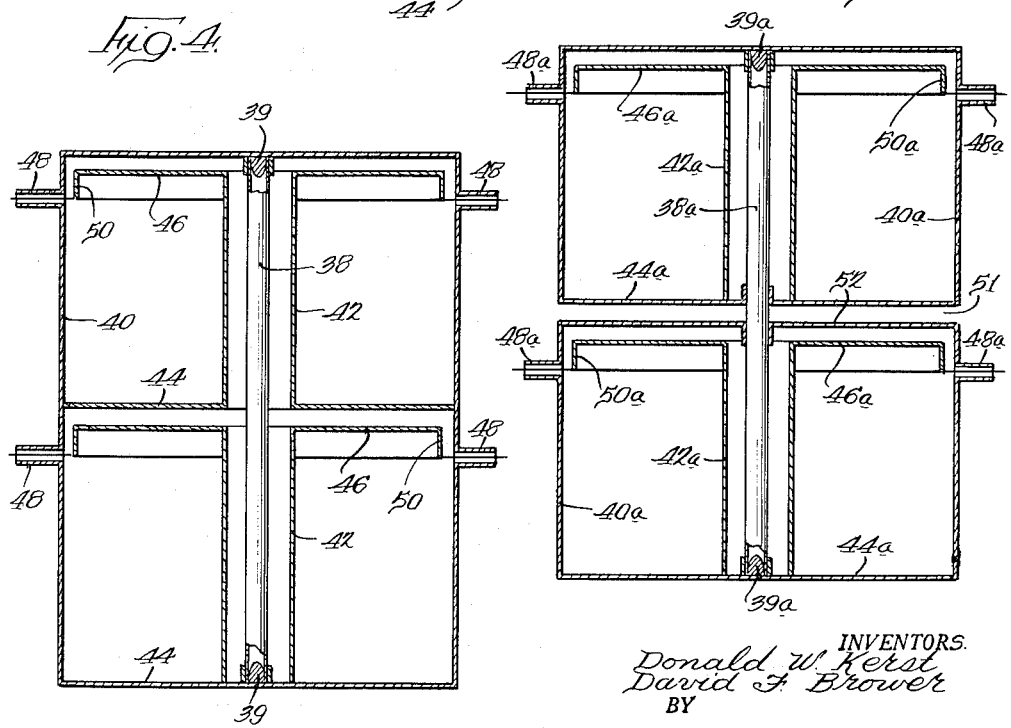
INVENTORS.
Donald W. Kerst
David F. Brower
BY
Soans, Anderson, Luedeka & Fitch
Attys

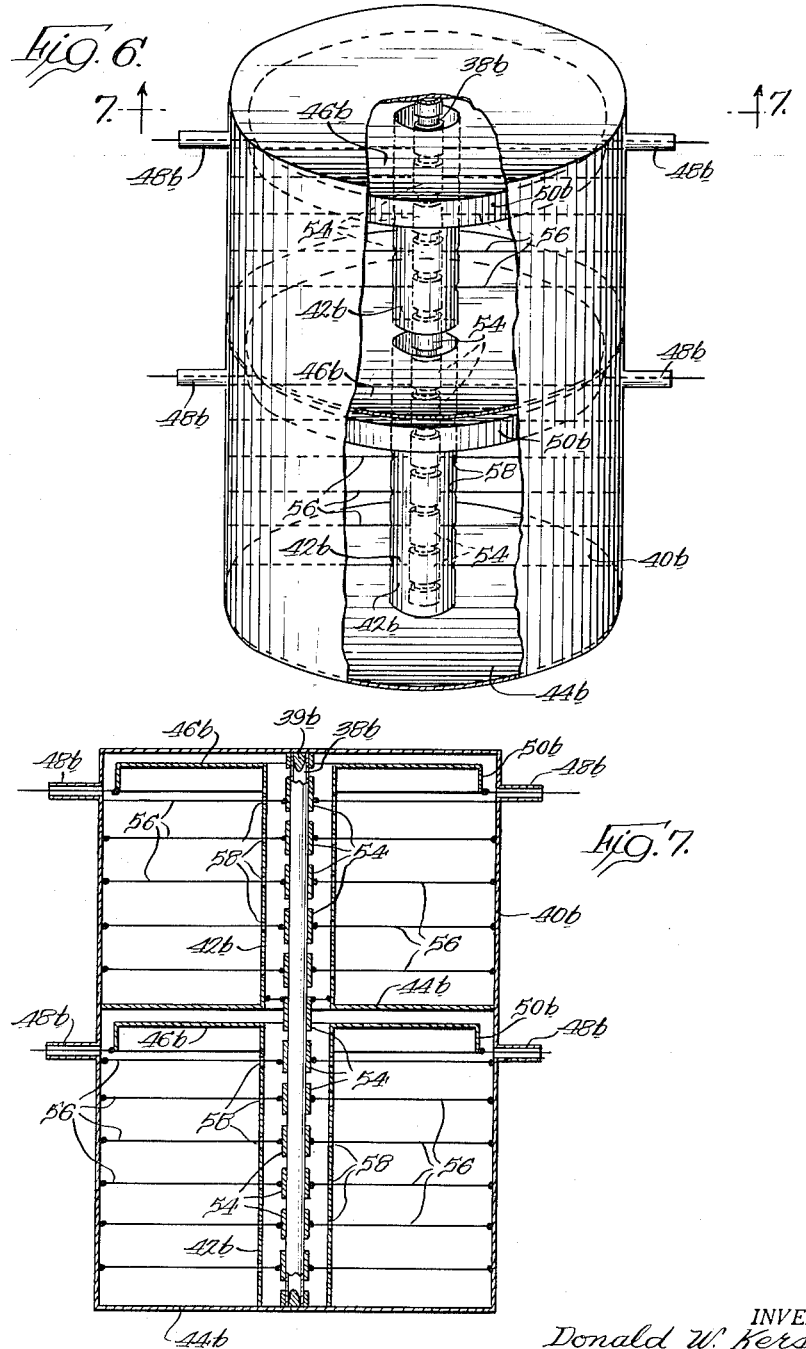

2,976,444
Patented Mar. 21, 1961

2,976,444

COUPLING DEVICE

Donald W. Kerst, La Jolla, and David F. Brower, Del Mar, Calif., assignors to General Dynamics Corporation, New York, N.Y., a corporation of Delaware Filed June 23, 1958, Ser. No. 743,817

9 Claims. (Cl. 313—62)

The present invention relates generally to an electrical coupling device and more particularly to a device for electrically coupling a plurality of relatively low voltage sources to provide a high intensity electric field across or around a given circuit.

In certain devices a high intensity electric field is required for asynchronously producing high current particle discharges. To produce such a field over a long path requires a high voltage, however, it is often difficult to obtain components which will handle or provide the required voltage. If these components are available they are ordinarily expensive and/or bulky. Also, high voltage components, if not properly protected are hazardous to personnel.

An object of the present invention is the provision of a device for coupling a plurality of relatively low voltage sources in a charged particle accelerator or gaseous discharge device so as to provide a resulting electric field which approaches the field produced by the sum of the individual low voltage sources. A further object of the present invention is to provide a coupling device which provides a desired high intensity electric field across or around a given path without requiring the use of expensive or inconvenient voltage sources or the creation of spurious voltages. A still further object of the present invention is to provide a coupling device of the type described which is economical to manufacture, rugged and durable, and efficient in operation.

Other objects and advantages of the present invention will become apparent from the following description and appended claims.

In the drawings:

Figure 3 is a schematic, perspective view of a linear discharge tube which is provided with an electrical coupling device in accordance with the present invention, portions of the device being cut away to show its internal construction;

Figure 4 is a sectional view taken along line 4—4 of Figure 3;

Figure 5 is a sectional view similar to that shown in Figure 4 of a linear discharge tube which is provided with an electrical coupling device in accordance with the present invention while including a field free access area to the discharge tube;

Figure 6 is a schematic, perspective view of a linear discharge tube which is provided with another embodiment of a coupling device in accordance with the present invention, portions of the device being cut away to show its internal construction; and Figure 7 is a sectional view taken along line 7—7 of Figure 6.

Figure 1:
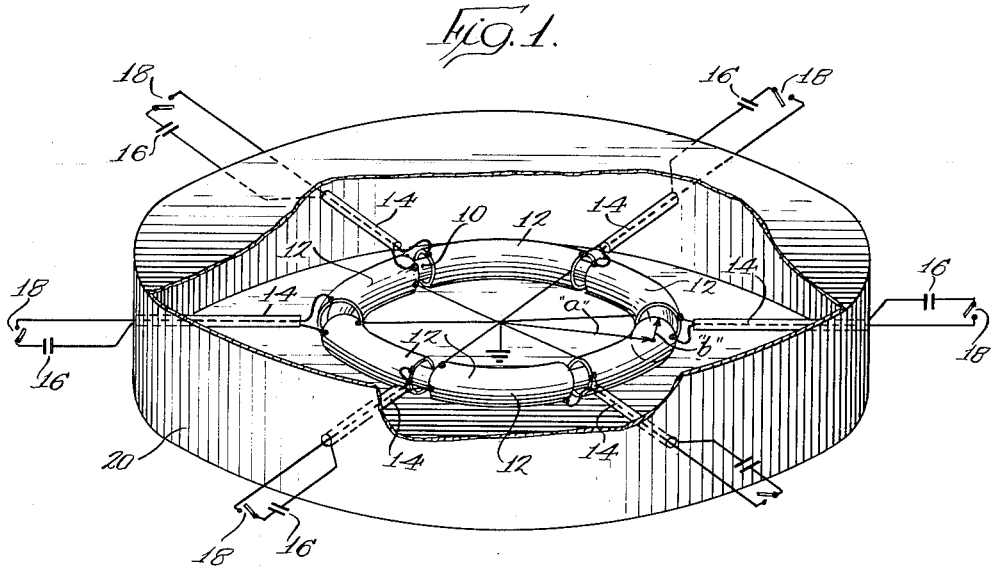
Figure 1 is a schematic, perspective view of a toroidal discharge tube which is provided with an electrical coupling device in accordance with the present invention, portions of the device being cut away to show its internal construction.

A coupling device constructed in accordance with the present invention comprises a plurality of separate primary circuits, each of which is adapted to provide a separate magnetomotive force which creates a flux when its circuit is closed. A conducting shield is provided to confine the flux from each circuit within a defined volume, and a secondary circuit is provided which is linked by all of the flux created by the primary circuits.

The coupling device is particularly useful with charged particle accelerating apparatus which may include a vacuum tube, gaseous discharge tube, etc., and which requires a high intensity electric field for operation. For purpose of explanation, the coupling device is explained in connection with a discharge tube, but it is equally applicable to other applications.

A discharge tube is an evacuated tube of suitable material, such as ceramic, which contains a low pressure gas or vapor and through which the charged particles in the gas may be conducted.

Free electrons and ions are always present in the gas within a discharge tube. If a suitable changing magnetic field is created by a primary circuit with respect to secondary circuit confined within a discharge tube, an electric field may be induced along the tube which will cause the electrons and ions to be propelled along the tube. If the induced electric field is large enough, a self-maintaining gaseous discharge will be produced in the tube.

An electric field may be induced along a discharge tube by a magnetic field produced by arranging a concentric ferromagnetic core around the tube, and passing current pulses through a coil of wire wound around the core. The magnetomotive force produced by the core produces a changing flux proportional to the applied voltage which encircles the discharge tube and induces an electric field therein. The magnitude of the total rate of change of magnetic flux, and hence the electric field, can be increased by disposing additional cores along the tube. However, in order to properly combine the electric fields induced by the magnetic fields produced by the cores, the magnetic fields must change essentially simultaneously. To achieve this, the applied voltages must be in phase and stray fields, which might alter the fields produced by the cores, must be minimized. These stray fields are especially troublesome because of the extent of the fields set up by current pulses passing through the coils. To eliminate unwanted and spurious fields it is necessary to confine the flux within the vicinity of the cores by means of a suitable shield.

Since the flux encircles the discharge tube it should be apparent that a similar magnetic field, and thus a similar electric field, could be produced by arranging a split hollow conductor around the discharge tube in place of each of the coils with the hollow space in place of a ferromagnetic core.

From the above, it can be seen that an effective high voltage may be produced in a secondary circuit confined within a discharge tube by enclosing the discharge tube with a succession of primary windings in the form of split hollow conductors which provide adequate shielding to minimize stray fields, and by simultaneously applying a pulsed voltage to each of the conductors.

Now referring to the drawings, Figure 1 shows a secondary circuit confined within a toroidal shaped discharge tube 10. Suitable means (not shown) are generally provided for filling the tube 10 with a desired gaseous material and for maintaining the tube at a desired pressure. Disposed sequentially about the discharge tube 10 are a plurality of primary windings on tubular segments 12, each of which forms part of a primary circuit, the segments being formed of a conductive material such as copper or the like. The discharge tube 10 is supported in any suitable manner, such as by insulating spacers, within the segments 12. One end of each of the segments 12 is grounded to a common point. The other end of each of the segments 12 is connected through a coaxial cable 14 to the remaining part of the primary circuit which comprises a suitable source of voltage pulses which, in the illustrated embodiment, includes a capacitor 16 in series with a switching means 18 such as an ignitron, thyratron, spark gap, etc. The other side or ground side of the capacitor 16 is connected through the outer conductor or shield of the coaxial cable 14 to the grounded side of an adjacent segment 12. Any suitable high-voltage supply (not shown) may be used to charge each of the capacitors 16 to the voltage desired.

As previously indicated, if the switching means 18 are simultaneously closed the total electromotive force or voltage induced by the magnetic fields of the segments 12 is equivalent to the sum of the individual voltages produced by the segments 12. The total voltage equals the voltage which would be induced if a voltage equal to the sum of the individual voltages was connected across all of the segments 12 connected in series.

It should be understood from the above that the number of segments 12 is selected so that economical high voltage components can be used. For a given total voltage desired, the more segments that are provided the lower the voltage applied to each segment.

If all of the capacitors 16 are charged so as to cause the current to flow through the segments in a clockwise direction, the magnetomotive force created causes flux to flow around the segments. This flux is directed downwardly in the center of the toroid and upwardly outside of the toroid as viewed in Figure 1.

As previously indicated, the flux on the outside of the toroid must be confined or else unwanted or spurious voltages might be generated by conductors such as power lines, instrument leads, etc., which are generally located in the immediate vicinity of the toroid. This produces the same effect as if one side of the voltage sources, which in this case are capacitors, was not grounded but was in effect "floating."

In the illustrated embodiment, the flux is confined within the vicinity of the toroid by means of a shield 20 constructed of conductive material, such as copper, which completely encloses the segments 12. The shield 20 is in the form of a flat cylindrical can. The segments 12 are supported in a suitable manner, such as by insulating spacers (not shown), within the shield 20.

The shield 20 crowds the flux lines into the space between the shield and the segments 12, thereby creating an outwardly directed force impinging upon the shield 20. Therefore, the shield 20 must be built of sufficient strength to resist this resulting force.

There is a certain amount of energy associated with the field setting up currents in the sheld 20. This constitutes a shunt inductance across the segments. The closer the shield 20 is to the segments 12, the less the shunt inductance. This lowering of shunt inductance creates an increase in the load on the voltage source. This load should, therefore, be kept to a minimum. The effect of the shield 20 on the current requirements can be made negligible by placing the shield 20 at a sufficient distance from the segments 12.

However, in the case of a toroid all of the flux encircling the toroidal segments 12 passes through the center hole of the toroid. Therefore, the encircling flux is prevented from extending outwardly by the size of the center hole of the toroid. Accordingly, little is gained by making the shield 20 larger than that necessary to clear the segments 12 by a distance equal to half the size of the center hole (i.e., a distance equal to the major radius "a" minus the minor radius "b" of the segments 12). A shield of this size will provide a shunt inductance not much smaller than would be provided by a shield of infinite size.

If a current does not occur in the discharge tube 10, the current flow through each of the segments 12 is limited only by the impedance of the segment 12. This current is referred to as a magnetizing current. When a current does occur in the discharge tube 10, the current flow in each of the segments 12 is much higher because the current flow through the discharge tube 10 reduces the impedance of the segment 12. Therefore, each of the condensers 16 discharges at a faster rate if a current flows in the discharge tube 10. The magnetizing current should be kept at a minimum so as to minimize the loss of energy. This can be accomplished by providing, as previously indicated, a shield 20 of sufficient size, or by using ferromagnetic material around segments 12.

Since the shield 20 prevents spurious voltages from being induced outside the device, no potential difference exists between the capacitors 16 which feed each of the segments 12. Therefore, the segments 12 may be connected in parallel and fed from a single capacitor bank if desired.

Figure 2:
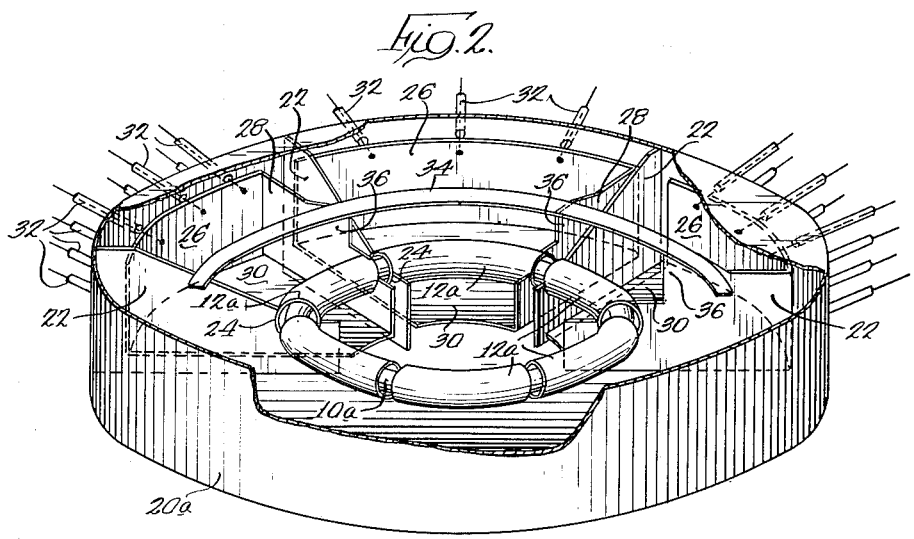
Figure 2 is a schematic, perspective view of a toroidal discharge tube which is provided with an electrical coupling device similar to that shown in Figure 1 but employing parallel plate transmission lines inside the device rather than coaxial cables, portions of the device being cut away to show its internal construction.

Since a very high current will flow through each of the segments 12, a coupling device such as that shown in Figure 2 is more practical than that previously described. In this embodiment, the coaxial cables in the device are replaced by parallel plate transmission lines. In this arrangement a separate radially extending grounding plate 22 of conductive material is connected between the side wall of the shield 20a and the grounded end of each of the segments 12a. The plates 22 may also be connected to the bottom of the shield 20a, so as to provide a support for the segments 12a. The upper edge of each of the plates 22 is tapered towards the center of the shield 20a and a suitable notch 24 is cut in the upper edge of the plate 22 to receive the grounded end of the associated segment 12a.

The high voltage side of each capacitor and the associated switching means is fed to a separate arcuate plate 26 which is spaced from the walls of the shield 20a, and from the radially extending grounding plates 22. One end of this arcuate plate 26 is connected to an associated radially extending plate 28 which in turn is suitably notched to receive the high voltage end of a segment 12a. A horizontally extending plate 30, which is spaced from the base of the shield 20a, may be connected to the lower edges of the arcuate plate 26 and the second mentioned radially extending plate 28.

Because of the high current that flows between the arcuate plate 26 and the capacitors, the connecting cable is, preferably, replaced by a plurality of cables 32. Using a plurality of cables 32 also reduces the inductance of the circuit.

The segments 12a are independent of each other until the current is started in the discharge tube 10a. Since this current passes through all of the segments 12a, if one of the voltage sources fails to be connected to its associated segment 12a along with the others, a very high voltage will be induced in that segment 12a. This may cause an insulation break-down or other damage. To minimize this, a permanent parallel connection may be made between the segments 12a such as a ring shaped shorting strap 34 connected to an upwardly extending projection 36 on each of the second mentioned radially extending plates 28. This places the segments 12a in parallel.

In one embodiment of the toroidal coupling device the discharge tube had a major radius of 10 inches and a minor radius of 2 inches. Six copper segments were disposed sequentially around the discharge tube. Each of these segments had an internal diameter of 4½ inches, an outer diameter of 5¼ inches, and a length of 10 inches. The enclosing shield, which was made of ⅜ inch copper plates, had an internal diameter of about 5 feet and a height of 2 feet 6 inches. The parallel plate transmission lines were made of ⅜ inch copper plates. The voltage source for each segment consisted of ten 30 microfarad capacitors each in series with an ignitron and separately connected by a cable to the parallel plate transmission line. Each of the capacitors was charged to 10 kilovolts.

The principles of this invention also can be applied to an elongated generally linear discharge tube. The coupling device may either enclose all of the discharge tube 38, as shown in Figures 3 and 4, or enclose only a portion of a discharge tube. As illustrated, the discharge tube 38 is arranged so as to be enclosed by a concentric tubular shield 40 which is closed at both ends. Electrodes 39 are provided at each end of the discharge tube 38, the electrodes 39, the current path within the discharge tube 38, and shield 40 comprising a secondary circuit. Concentric segments or primary windings 42 are arranged sequentially along the discharge tube. Only two such segments 42 are shown for purpose of illustration. Opposite ends of each of the segments 42 are connected to centrally disposed holes in transversely extending disk shaped plates 44 and 46 respectively. The plates 44, which ground the segments 42, are connected to the side wall of the shield 40. One of the grounding plates 44 may form a wall of the shield 40, as illustrated.

A separate flange 50 which is spaced from the shield 40 is arranged on the outer edge of each of the plates 46 which connect to the high voltage ends of the segments 42. Each flange 50 is connected through a plurality of coaxial cables 48 to a source of high-voltage such as that previously described.

The principle of operation of the linear coupling device is similar to the operation of the toroidal coupling device previously described. The linear coupling device may be considered as a toroidal coupling device which is straightened out. When the voltage source is applied to each of the segments 42, a current is caused to flow therethrough. The current flow creates a magnetomotive force which produces a flux which encircles and is within each of the segments 42. The flux on the interior of the segments 42 induces a high intensity electric field along the discharge tube 38 which accelerates the charged particles therein.

While in the toroidal coupling device the amount of flux threading the shield 40 was limited by the size of the center hole of the toroid, in the linear coupling device the flux is free to spread out and thread the shield 40. Therefore, as previously indicated, the magnetizing current through each of the segments 42 is reduced by increasing the distance between the shield 40 and the segments 42.

In some applications it is desirable to have certain parts of the discharge tube 38 within the coupling device accessible. Because the shield 40 completely encloses the segments 42 and the discharge tube 38, it is very difficult to gain access to the discharge tube 38. One way that this problem can be eliminated is to provide access spaces 51 such as the one shown in Figure 5. In this arrangement an access space 51 is disposed between a pair of segments 42 by increasing the space between the segments 42, and adding an auxiliary plate 52 which is spaced from the high voltage plate 46a and which extends between the shield 40a and the discharge tube 38a. This provides an essentially field free access to the discharge tube without decreasing the shielding appreciably. A field free access may be obtained in a generally similar manner in the toroidal coupling device illustrated in Figures 1 and 2.

In one application a linear coupling device was used as an asynchronous accelerator. In this device one hundred and twenty tubular segments of 1/16 inch copper were disposed sequentially along a 40 foot linear tube. The segments each had a diameter of about 4 inches and a length of about 4 inches. The shield enclosing the segments was made of 1/16 inch copper plate and was about 12 inches in diameter and 40 feet in length. The plates connecting the segments to the shield and to the voltage source were made of 1/16 inch copper plate. Each of the segments was fed by a voltage source which included a 7.0 microfarad condenser in series with an ignitron. The condenser was charged to a voltage of 15 kilovolts.

In the above described coupling devices the segments are relatively long and, therefore, the electric field induced in the discharge tube will be uneven. The charged particles are accelerated in large steps, as for example, in the linear coupling device illustrated in Figures 3 through 5, the particles are accelerated in two steps.

Figures 6 and 7 illustrate a means by which the electric field induced by each segment can be split up into a series of sequential electric fields. In this embodiment, a series of spaced apart tubular conductors 54 are arranged sequentially along the discharge tube 38b and centrally within each segment 42b. Each tubular conductor 54 is suitably supported, and is grounded to the shield 40b by conductors 56 which extend through suitable holes 58 in the segments 42b.

The extent of the subdivision of each segment depends upon the smoothness of the electric field desired along the secondary path, and the number of segments along the discharge tube is chosen so that economical electrical components can be used to drive each segment.

It should be understood that the additional tubular conductors can be applied to the toroidal coupling device in a similar manner.

The above described coupling devices were explained as being applied to a discharge tube, however, it should be understood that the coupling device also can be applied so as to create accelerating fields for charged particles in vacuum tubes. In applying the coupling device so as to accelerate charged particles, the segments may be either pulsed by separate voltage sources or by one voltage source, depending upon the required repetition rate.

The coupling device described above provides a means by which a high intensity electric field can be induced in a secondary circuit without the need for high voltage components. Various changes and modifications which will be obvious to those skilled in the art may be made in the above described coupling device without departing from the spirit or scope of the present invention. Various of the novel features of the invention are set forth in the appended claims.

We claim:

1. An electrical coupling device comprising an elongated secondary circuit, a plurality of elongated generally tubular conductors extending about and sequentially disposed along a portion of said secondary circuit, a source of voltage associated with each pair of adjacent conductors, said sources of voltage being in phase with each other, means for simultaneously connecting said sources of voltage to said associated pairs of adjacent conductors, said source of voltage being arranged to simultaneously provide a current flow in the same direction through each of said conductors, each conductor thereby providing a magnetomotive force which creates a flux that passes about the secondary circuit in the same direction, and a conducting shield which confines the flux created by the conductors within a defined volume in the vicinity of said portion of said secondary circuit.

2. An electrical coupling device comprising an elongated discharge tube, a plurality of elongated generally tubular conductors extending about and sequentially disposed along said tube, a common source of voltage, means for simultaneously connecting said source of voltage to each pair of adjacent conductors each thereby providing a magnetomotive force which creates a flux that passes about the discharge tube, and a conducting shield which confines the flux created by the conductors within a defined volume in the vicinity of the discharge tube.

3. An electrical coupling device comprising an elongated secondary circuit, a plurality of elongated generally tubular conductors extending about and sequentially disposed along a portion of said secondary circuit, a source of voltage associated with each pair of adjacent conductors, said sources of voltage being in phase with each other, means for simultaneously connecting said sources of voltage to the associated pairs of adjacent conductors, said sources of voltage being arranged to simultaneously provide a current flow in the same direction through each of said conductors, each conductor thereby providing a magnetomotive force which creates a flux that passes about said portion of said secondary circuit in the same direction, additional conductors positioned within each of said tubular conductors, each additional conductor being shaped so as to subdivide the electrical field within the tubular conductor into a plurality of segments to provide a predetermined distribution of electric field along said portion of said secondary circuit, and a conducting shield which confines the flux created by the tubular conductors within a defined volume in the vicinity of said portion of said secondary circuit.

4. An electrical coupling device comprising an elongated discharge tube, a plurality of elongated generally tubular conductors extending about and sequentially disposed along said tube, a common source of voltage, means for simultaneously connecting said source of voltage to each pair of adjacent conductors, each conductor thereby providing a magnetomotive force which creates a flux that passes about the discharge tube, additional conductors positioned within each of said tubular conductors, each additional conductor being shaped so as to subdivide the electric field within the conductor into a plurality of segments to provide a predetermined distribution of electric field along said discharge tube, and a conducting shield which confines the flux created by the tubular conductors within a defined volume in the vicinity of the discharge tube.

5. An electrical coupling device comprising an elongated secondary circuit, a plurality of elongated generally tubular conductors extending about and sequentially disposed along a portion of said secondary circuit, a source of voltage associated with each pair of adjacent conductors, said sources of voltage being in phase with each other, means for simultaneously connecting said sources of voltage to the associated pairs of adjacent conductors, said sources of voltage being arranged to simultaneously provide a current flow in the same direction through said conductors, each conductor thereby providing a magnetomotive force which creates a flux that passes about said portion of said secondary circuit in the same direction, and a conducting shield which confines the flux created by the conductors within a defined volume in the vicinity of said portion of said secondary circuit, said conducting shield being shaped to provide a generally flux free access means to at least a portion of said secondary circuit.

6. An electrical coupling device comprising a toroidal discharge tube, a plurality of elongated generally tubular segments formed of conductive material disposed sequentially along said tube and in concentric relationship therewith, a source of voltage associated with each pair of adjacent segments, said sources of voltage being in phase with each other, means for simultaneously connecting said sources of voltage to the associated pairs of adjacent segments, said sources of voltage being arranged to simultaneously provide a current flow in the same direction through said conductors, each segment thereby providing a magnetomotive force which creates a flux that passes through the discharge tube in the same direction, and a conducting shield which confines the flux created by the segments within a defined volume in the vicinity of the discharge tube.

7. An electrical coupling device comprising a toroidal discharge tube, a plurality of elongated generally tubular segments formed of conductive material disposed sequentially along said tube and in concentric relationship therewith, a common source of voltage, means for simultaneously connecting said source of voltage to each pair of adjacent segments, each segment thereby providing a magnetomotive force which creates a flux which passes through the discharge tube, and a conducting shield which confines the flux created by the segments within a defined volume in the vicinity of the discharge tube.

8. An electrical coupling device comprising a toroidal discharge tube, a plurality of elongated generally tubular segments formed of conductive material disposed sequentially along said tube and in concentric relation therewith, a common source of voltage, means for simultaneously connecting said source of voltage to each pair of adjacent segments, each segment thereby providing a magnetomotive force which creates a flux that passes through the discharge tube, and a conducting shield which confines the flux created by the segments within a defined volume in the vicinity of the discharge tube, said shield being of such a size as to clear the segments by a distance at least equal to the major radius minus the minor radius of the segments.

References Cited in the file of this patent

UNITED STATES PATENTS

| | | |
|---|---|---|
| 2,299,792 | Bouwers et al. | Oct. 27, 1942 |
| 2,531,028 | Philos | Nov. 21, 1950 |
| 2,546,035 | Lichtenstein | Mar. 20, 1951 |
| 2,836,759 | Colgate | May 27, 1958 |
| 2,843,788 | Peter | July 15, 1958 |